US012566724B2

(12) United States Patent (10) Patent No.: US 12,566,724 B2
Liao (45) Date of Patent: Mar. 3, 2026

(54) SEQUENTIAL PROCESSING METHOD AND APPARATUS OF DATA PACKET

(71) Applicant: Spreadtrum Communications (Shanghai) Co., Ltd., Shanghai (CN)

(72) Inventor: Yuan Liao, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 175 days.

(21) Appl. No.: 18/522,884

(22) Filed: Nov. 29, 2023

(65) Prior Publication Data

US 2024/0095172 A1 Mar. 21, 2024

Related U.S. Application Data

(63) Continuation of application No. PCT/CN2021/141390, filed on Dec. 24, 2021.

(30) Foreign Application Priority Data

Jun. 4, 2021 (CN) .......................... 202110624926.8

(51) Int. Cl.
*G06F 15/167* (2006.01)
*G06F 15/76* (2006.01)
*G06F 12/0842* (2016.01)

(52) U.S. Cl.
CPC ........ *G06F 15/167* (2013.01); *G06F 12/0842* (2013.01); *G06F 2015/765* (2013.01); *G06F 2212/6042* (2013.01)

(58) Field of Classification Search
CPC ........... G06F 15/825; G06F 2212/6042; G06F 12/0842; G06F 9/544; G06F 15/167
See application file for complete search history.

(56) References Cited

U.S. PATENT DOCUMENTS

| | | | | |
|---|---|---|---|---|
| 2005/0188180 A1* | 8/2005 | Illmann | ............... | G06F 15/8053 |
| | | | | 712/216 |
| 2012/0079209 A1* | 3/2012 | Zhou | .................... | G06F 15/167 |
| | | | | 711/141 |
| 2017/0185449 A1* | 6/2017 | Zhang | ................. | G06F 12/0842 |

FOREIGN PATENT DOCUMENTS

| | | |
|---|---|---|
| CN | 101840328 A | 9/2010 |
| CN | 102331923 A | 1/2012 |
| CN | 104394096 A | 3/2015 |
| CN | 107277062 A | 10/2017 |
| CN | 109032704 A | 12/2018 |
| CN | 109688606 A | 4/2019 |
| CN | 110764924 A | 2/2020 |

(Continued)

OTHER PUBLICATIONS

Chinese Office Action dated Jun. 22, 2022; for Chinese Application No. 2021106249268 filed Jun. 4, 2021; Applicant Spreadtrum Communications (Shanghai) Co., Ltd.

(Continued)

*Primary Examiner* — Courtney P Spann
(74) *Attorney, Agent, or Firm* — Quarles & Brady LLP

(57) ABSTRACT

The present disclosure provides a data packet processing method and apparatus, when multiple data packets and descriptors are continuously received, the data packet processing apparatus stores the data packets in a cache unit, and the multiple data packets are processed respectively, by multiple processing units, in parallel and at the same time according to the descriptors of the multiple data packets.

18 Claims, 7 Drawing Sheets

(56)            References Cited

FOREIGN PATENT DOCUMENTS

| CN | 112882989 A | 6/2021 |
| CN | 113360448 A | 9/2021 |

OTHER PUBLICATIONS

Chinese Notice of Allowance dated Jan. 10, 2023; for Chinese Application No. 2021106249268 filed Jun. 4, 2021; Applicant Spreadtrum Communications (Shanghai) Co., Ltd.
International Search Report and Written Opinion for International Application No. PCT/CN2021/141390 filed on Dec. 24, 2021.

* cited by examiner

SEQUENTIAL PROCESSING METHOD AND APPARATUS OF DATA PACKET

CROSS-REFERENCE TO RELATED APPLICATION

The present application is a continuation application of International Application No. PCT/CN2021/141390, filed on Dec. 24, 2021, which claims priority to Chinese Patent Application No. 202110624926.8, filed on Jun. 4, 2021 to the China National Intellectual Property Administration, entitled "DATA PACKET PROCESSING METHOD AND APPARATUS", both of which are incorporated into the present application by reference in their entireties.

TECHNICAL FIELD

The present disclosure relates to the field of communication technology, and in particular, to a data packet processing method and apparatus.

BACKGROUND

With the continuous development of communication technology and electronic technology, the number of data elements in a data packet transmitted between devices during communication is increasing, in order to improve processing efficiency, a first device that sends a data packet can use a descriptor to describe basic information of the data elements in the data packet, so that a second device can process the data elements that need to be processed in the data packet through the descriptor, avoiding directly processing the entire data packet.

SUMMARY

The present disclosure provides a data packet processing method and apparatus.

A first aspect of the present disclosure provides a data processing apparatus, including: a cache unit, and multiple processing units; where, the multiple processing units are sequentially connected in series, each processing unit is connected to the cache unit; the cache unit is configured to sequentially receive multiple data packets and store the received data packets, the cache unit stores a next data packet before a processing on any data packet by the multiple processing units is completed; the multiple processing units are configured to sequentially receive multiple descriptors corresponding to the multiple data packets, and process a data packet corresponding to a descriptor stored in the cache unit according to each descriptor of the multiple descriptors, and send a descriptor of a processed data packet to a next connected processing unit; where, before a processing on any data packet by the multiple processing units is completed, if any processing unit receives a descriptor corresponding to a next data packet, the any processing unit processes the next data packet according to the descriptor corresponding to the next data packet.

In a possible embodiment of the first aspect, the cache unit is a cache, each of the multiple processing unit is a processor.

A second aspect of the present disclosure provides a data packet processing method, which can be applied in the data processing apparatus provided by the first aspect of the present disclosure. The data packet processing method includes: sequentially receiving multiple data packets and storing the received data packets into a cache unit, where, the cache unit stores a next data packet before a processing on any data packet by the multiple processing units is completed; sequentially receiving, by the multiple processing units, multiple descriptors corresponding to the multiple data packets, and processing a data packet corresponding to a descriptor stored in the cache unit according to each descriptor of the multiple descriptors, and sending a descriptor of a processed data packet to a next connected processing unit; where, before a processing on any data packet by the multiple processing units is completed, if any processing unit receives a descriptor corresponding to a next data packet, processing the next data packet according to the descriptor corresponding to the next data packet.

In a possible embodiment of the second aspect, the cache unit is a cache, each of the multiple processing unit is a processor.

A third aspect of the present disclosure provides an electronic device, including: a processor and a memory; where, the memory stores a computer program, and when the processor executes the computer program, the processor can be configured to execute the data packet processing method as described in the second aspect of the present disclosure.

A fourth aspect of the present disclosure provides a computer readable storage medium, where, the computer readable storage medium stores a computer program, the computer program can be configured to execute the data packet processing method as described in the second aspect of the present disclosure when being executed.

BRIEF DESCRIPTION OF DRAWINGS

In order to illustrate embodiments of the present disclosure or the technical solutions in the related art more clearly, the drawings that need to be used in the description of the embodiments or the related art will be briefly introduced in the following. Obviously, the drawings in the following description are some embodiments of the present disclosure. For those of ordinary skill in the art, other drawings can be obtained according to these drawings without paying any creative effort.

DESCRIPTION OF EMBODIMENTS

Figure 1:
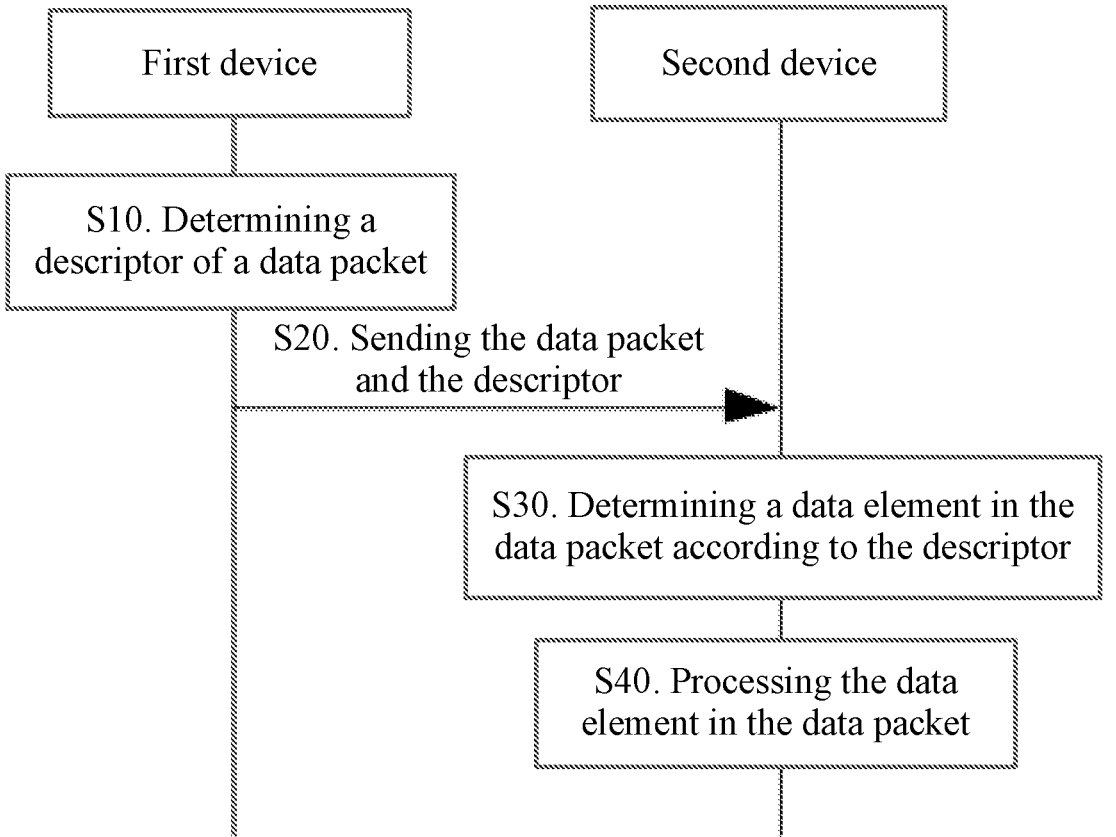
FIG. 1 is a schematic flowchart of an embodiment of a scenario of data packet transmission in the related art.

In the below, the technical solutions in the embodiments of the present disclosure will be described clearly and comprehensively in combination with the drawings in the embodiments of the present disclosure. Obviously, the described embodiments are part of the embodiments of the present disclosure, rather than all of them. All other embodiments obtained by those of ordinary skill in the art without paying any creative effort based on the embodiments in the present disclosure belong to the protection scope of the present disclosure.

The terms "first", "second", "third", "fourth", etc. (if any) in the description, claims, and the above drawings of the present disclosure are used to distinguish similar objects, and need not be used to describe a specific order or sequence. It should be understood that, the data so used can be interchanged where appropriate, so that the embodiments of the present disclosure described herein can be implemented, for example, in an order other than what is shown in the figures or what is described herein. In addition, the terms "include" and "have" and any variations thereof are intended to cover non-exclusive inclusion. For example, a process, method, system, product or device that contains a series of steps or units need not be limited to those steps or units that are clearly listed, but can include other steps or units that are not clearly listed or are inherent to these processes, methods, products or devices.

Before formally introducing the embodiments of the present disclosure, the application scenarios of the present disclosure and problems existed in the related art in combination with the drawings are illustrated firstly. Specifically, the present disclosure is applied in a data transmission scenario of communication technology, if a subject of sending data is designated as a first device and a subject of receiving data is designated as a second device, the first device can send data in the form of a data packet to the second device. In some embodiments, the first device and the second device can send a data packet through a mobile communication network, such as 5G communication networks, or, the first device and the second device can also send a data packet through other wireless communication technologies, such as Bluetooth, Wi-Fi, and other short range wireless communication methods. In some embodiments, the first device and the second device may be electronic devices capable of communication such as mobile phones, tablets, computers, servers, etc., or the first device and the second device may also be chips specifically used for communication, such as 5G communication chips, Wi-Fi communication chips, etc. The first device and the second device may be the same or different. The present disclosure does not limit the specific implementation forms of the first device and the second device, as long as data packets can be transmitted between the first device and the second device.

In the related art, the second device may include multiple processing units connected in series, each processing unit can correspond to an operation on data packet, and when the second device receives the data packet, the second device can process the data packet by the multiple processing units in sequence. When a last processing unit of the second device completes the processing on the data packet, the second device outputs a processed data packet and descriptor.

Using the related art, the second device needs to wait for all processing units in the second device to process a previous data packet every time the second device processes a data packet. With the increase in the amount of modern data intersection information, the second device requires more and more time to process each data packet, thereby reducing the processing speed and efficiency of continuous data packets.

FIG. 1 is a schematic flowchart of an embodiment of a scenario of data packet transmission in the related art. In an example shown in FIG. 1, a process of a first device sending a data packet to a second device includes following steps:

firstly, in order to send the data packet, the first device, as a sender of the data packet, first determines the data packet that needs to be sent to the second device and further determines a descriptor of the data packet in S10. As the number of data elements in the data packet increases, in order to improve processing efficiency and reduce the repeated processing on a data packet with a large data amount by a device, in some technologies, the first device sending the data packet can use a descriptor to describe basic information of data elements in the data packet, to assist a subsequent process of the processing on the data packet by the second device, so that the second device can process the data elements that need to be processed in the data packet through the descriptor, avoiding a direct processing of the entire data packet, thereby achieving technical effects such as improving the processing efficiency of the data packet, improving processing speed, and reducing processing latency. For example, the descriptor can be used to indicate a length, a type, and a field position of data elements in the data packet. For the specific implementation form of descriptors, the present disclosure does not make a limitation, and reference can be made to the specific definition and implementation of descriptors in related art.

Figure 2:
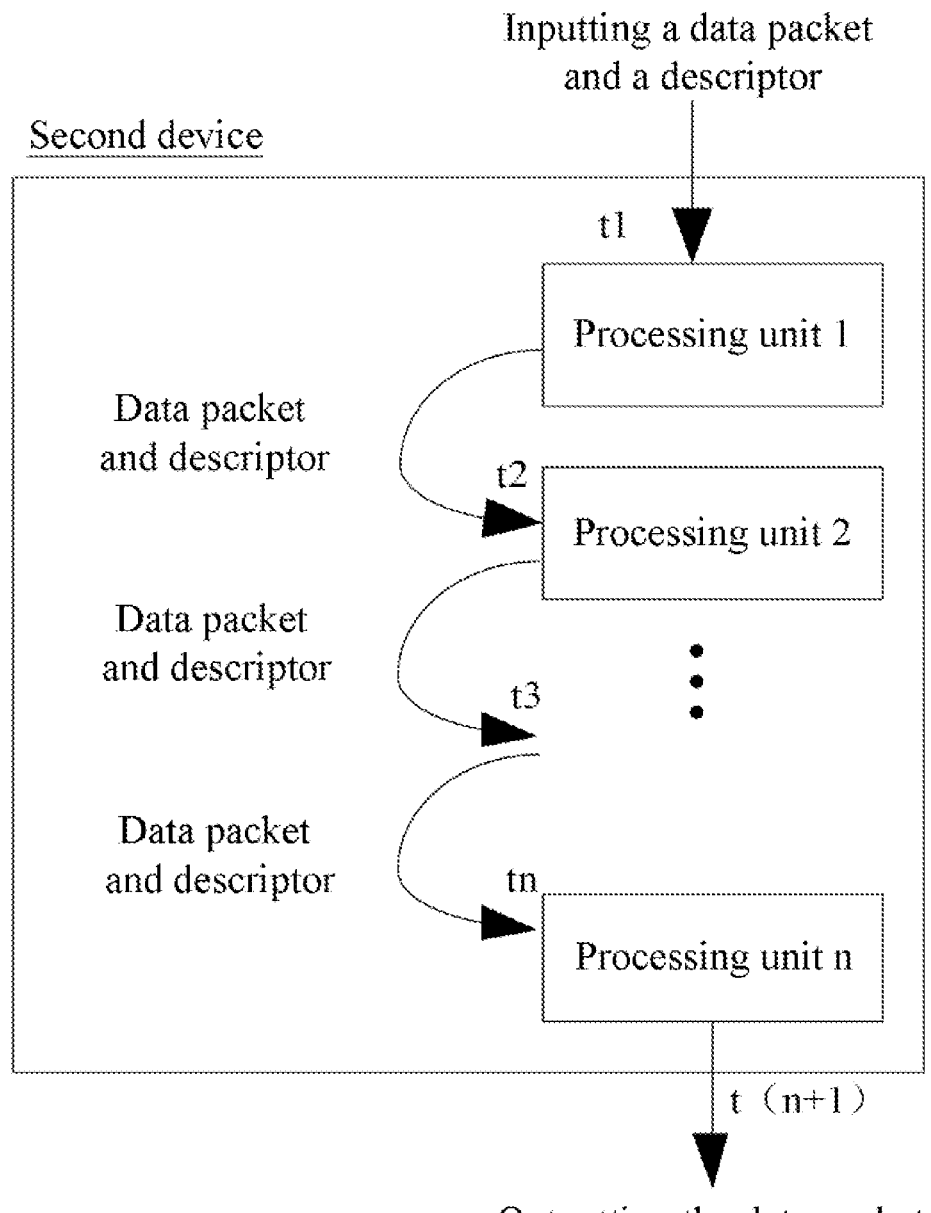
FIG. 2 is a schematic flowchart of a processing on data packets by a second device in the related art.

Subsequently, the first device, through S20, sends the data packet and the descriptor determined in S10 to the second device, so that after receiving the data packet and the descriptor, the second device first determines the data elements that need to be processed in the data packet according to the descriptor in S30, and then obtains and processes the data elements from the data packet according to a direction of the descriptor through S40, completing the operation of the processing on the data packet by the second device. In some embodiments, FIG. 2 is a schematic flowchart of processing on data packets by the second device in the related art, in which, the second device may include multiple processing units connected in series, for example, if the second device is a processing chip, each processing unit may a core within the chip. In FIG. 2, n processing units are taken as an example, each processing unit may correspond to an operation on the data packet, then after receiving the data packet, the second device can process the data packet by the multiple processing units in sequence, when the $n^{th}$ processing unit completes the processing on the data packet, the second device outputs processed data packet and descriptor. It can be understood that, in the above process, each processing unit may modify the descriptor of the data packet adaptively after processing the data packet.

In some embodiments, if processing unit 1 in the second device receives a data packet and a descriptor at time t1, processing unit 1 begins to perform an operation of determining and processing data elements according to descriptors in S30-S40, and after the processing is completed, processing unit 1 sends the data packet and the descriptor to processing unit 2 at time t2, processing unit 2 continues to process the data packet and sends the data packet to processing unit 3 at time t3; by analogy, after receiving the data packet and the descriptor at time tn, the processing unit n processes the data packet and outputs the processed data packet at time t(n+1). The total time for the second device to process the data packet is a sum of the time for each processing unit to process the data packet.

Figure 3:
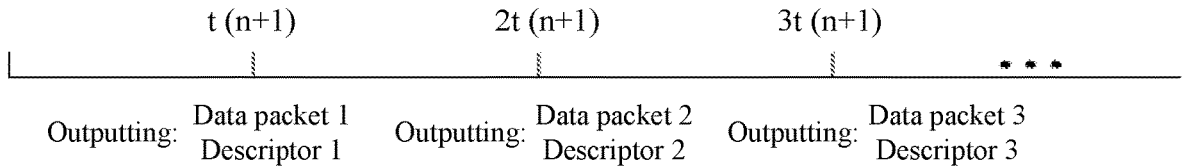
FIG. 3 is a schematic diagram of a timing sequence of processing data packets in the related art.

After the second device as shown in FIG. 2 continuously receives data packets, the second device needs to complete a processing on a previous data packet before processing the data packets. For example, FIG. 3 is a schematic diagram of a timing sequence of processing data packets in the related art, in which, it is assumed that the second device completes the processing on data packet 1 and outputs data packet 1 at time t(n+1) after receiving data packet 1 and descriptor 1. Even if data packet 2 that is to be processed subsequently is received before time t(n+1), data packet 2 cannot be processed, the second device cannot start to process data packet 2 until time t(n+1) and outputs the processed data packet 2 and descriptor 2 at time 2*t*(n+1). By analogy, an output of a data packet each time needs to wait for a sum of the processing time for all processing units in the second device to process the data packet. With the increase in an amount of modern data intersection information, the second device requires more and more time to process each data packet, thereby greatly reducing the processing speed and efficiency of continuous data packets, and affecting the real-time processing on the continuous data packets.

In order to solve the above technical problem of low speed and efficiency when processing the continuous data packets, the present disclosure also provides a data packet processing method and apparatus, in which, a received data packet is stored in a cache unit, and data packets aggregated by the cache unit are processed sequentially according to descriptors by multiple processing units; when multiple data packets are received continuously, the multiple processing units can process the multiple data packets respectively and in parallel at the same time, invalid waiting time when processing the data packets is reduced in order to improve the speed and efficiency when processing the data packets, and the real-time processing on the data packets is ensured.

Figure 4:
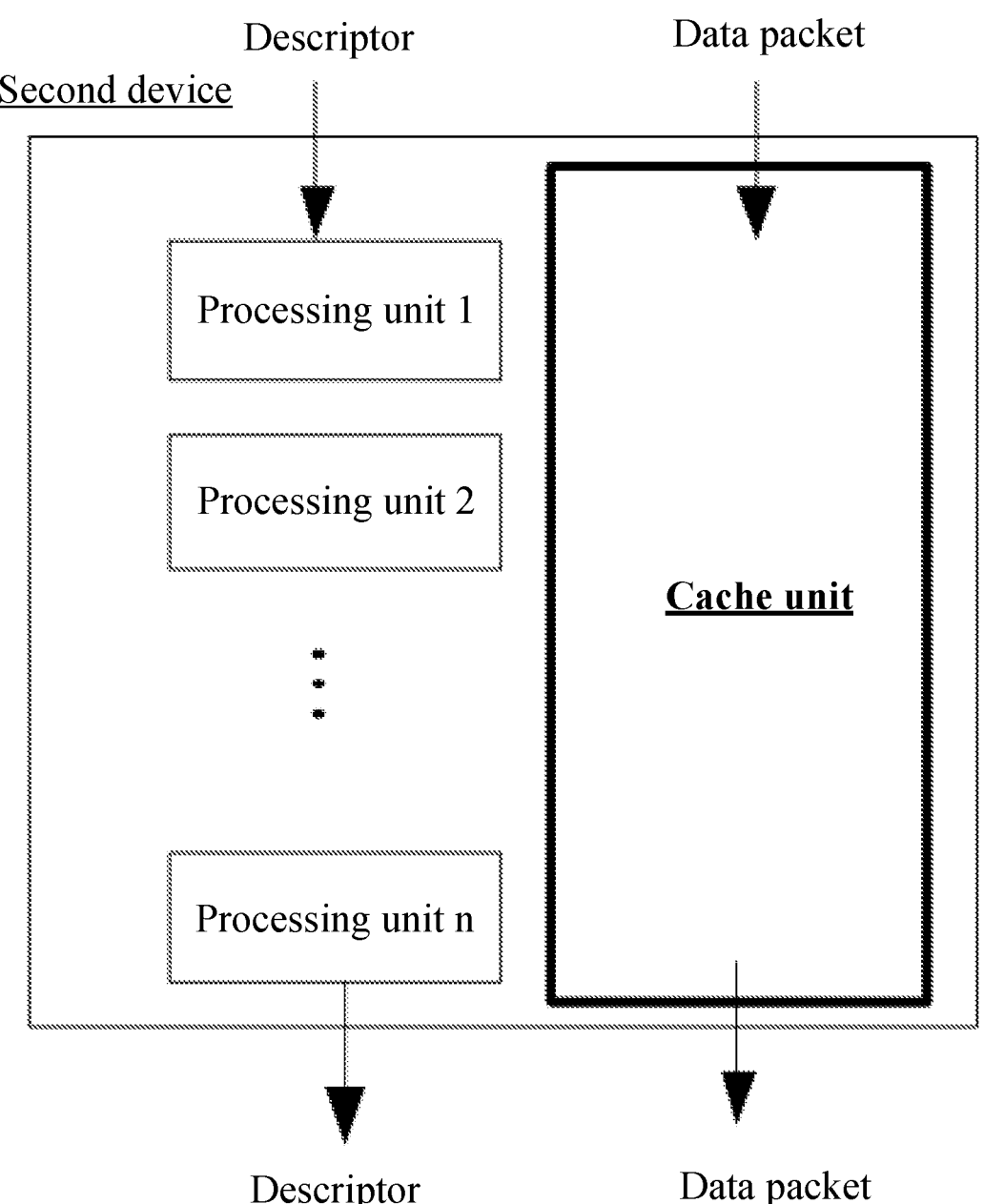
FIG. 4 is schematic structure diagram of an embodiment of a data packet processing apparatus provided by the present disclosure.

The following is a detailed explanation of the technical solution of the present disclosure with specific embodiments. The following specific embodiments can be combined with each other, and the same or similar concepts or processes may not be repeated in some embodiments. FIG. 4 is schematic structure diagram of an embodiment of a data packet processing apparatus provided by the present disclosure. The data packet processing apparatus as shown in FIG. 4 may be regarded as the second device in the scenario as shown in FIG. 1, and used to receive the data packet sent by the first device.

Specifically, the data packet processing apparatus provided by this embodiment includes: a cache unit and multiple processing units, n processing units are taken as an example in FIG. 4. The cache unit is configured to receive a data packet and store the received data packet. n processing units are sequentially connected in series, if processing unit 1 located in the serial initial position is a first processing unit, processing unit 1 can be used to receive a descriptor corresponding to the data packet at the same time that the cache unit receives the data packet. And processing unit 1 is also connected to a subsequent processing unit 2, processing unit 2 is connected to a subsequent processing unit 3 in series, and so on. For ease of description, in the present disclosure, a direction where processing unit 1 is located is marked as front and a direction where processing unit n is located is marked as rear in processing unit 1-processing unit n; then, each processing unit receives a descriptor sent by a previous processing unit in front, and can process the data packet stored in the cache unit according to the descriptor and then send the descriptor to the next processing unit in the rear.

In some embodiments, for each processing unit in n processing units, when processing a data packet according to a descriptor, each processing unit can first determine position information of a candidate data element in the data packet according to the descriptor. For example, a processing unit needs to read a data element in the data packet, then determines position information add1 of the data element stored in the data packet according to the descriptor, and subsequently reads the data element from the position add1 of the data packet stored in the cache unit according to position information add1; for another example, a processing unit needs to write a data element into the data packet, then determines position information add2 where can be used to write the data element in the data packet according to the descriptor, and subsequently writes the data element into the position add2 of the data packet stored in the cache unit according to position information add2.

In some embodiments, the processing unit may make changes to the data element within the data packet. And after the processing unit makes modifications to the data packet, the processing unit can also make adaptive changes to the descriptor, in order to ensure real-time and accuracy of the descriptor. For example, after the processing unit receives a descriptor sent by the previous processing unit and writes elements into the data packet in the storage space according to the descriptor, the length of the data packet changes at this time. Therefore, the processing unit needs to adaptively modify the length information of the data packet in the descriptor before sending the modified descriptor to a next processing unit, so that the next processing unit can process the data packet according to the latest descriptor.

In other embodiments, due to the sequential processing on data packets by the multiple processing units within the data packet processing apparatus belongs to different steps (also known as process, short for PROC) in the same processing process, the data elements processed between respective different steps may not conflict, the last processing unit n among multiple processing units can be used, after all processing units complete the processing on the data packet, uniformly modify the descriptor of the data packet. Alternatively, a descriptor modification unit (which can be implemented through one processing unit of the data packet processing apparatus) may be set up within the data packet processing apparatus. After the multiple processing units complete the processing on the data packet in sequence, the descriptor modification unit uniformly modifies the descriptor of the data packet according to the processing on the data packet by the multiple processing units. The unified modification of the descriptor in this embodiment can effectively reduce the number of times for modification to descriptors and further improve the processing efficiency.

Specifically, in the embodiment of the present disclosure, when the multiple processing units sequentially process a data packet according to the descriptor of the data packet, if a next data packet and a descriptor are received, different processing units can be used to process the data packets that are received previously and subsequently instead of waiting for that a processing on the currently data packet is completed. At this time, a newly received data packet can be stored in the cache unit, and at the same time, the next data packet can also be processed in parallel by multiple processing units according to the descriptor of the next data packet before a processing on the current data packet by multiple processing units is completed. So that, if any processing unit, before a processing on any data packet by others of the multiple processing units is completed, receives a descriptor corresponding to a next data packet, the any processing unit can continuously process the next data packet according to the descriptor corresponding to the next data packet; at the same time, the cache unit can also be used to store a next data packet before the processing on any data packet by the multiple processing units is completed.

Figure 5:
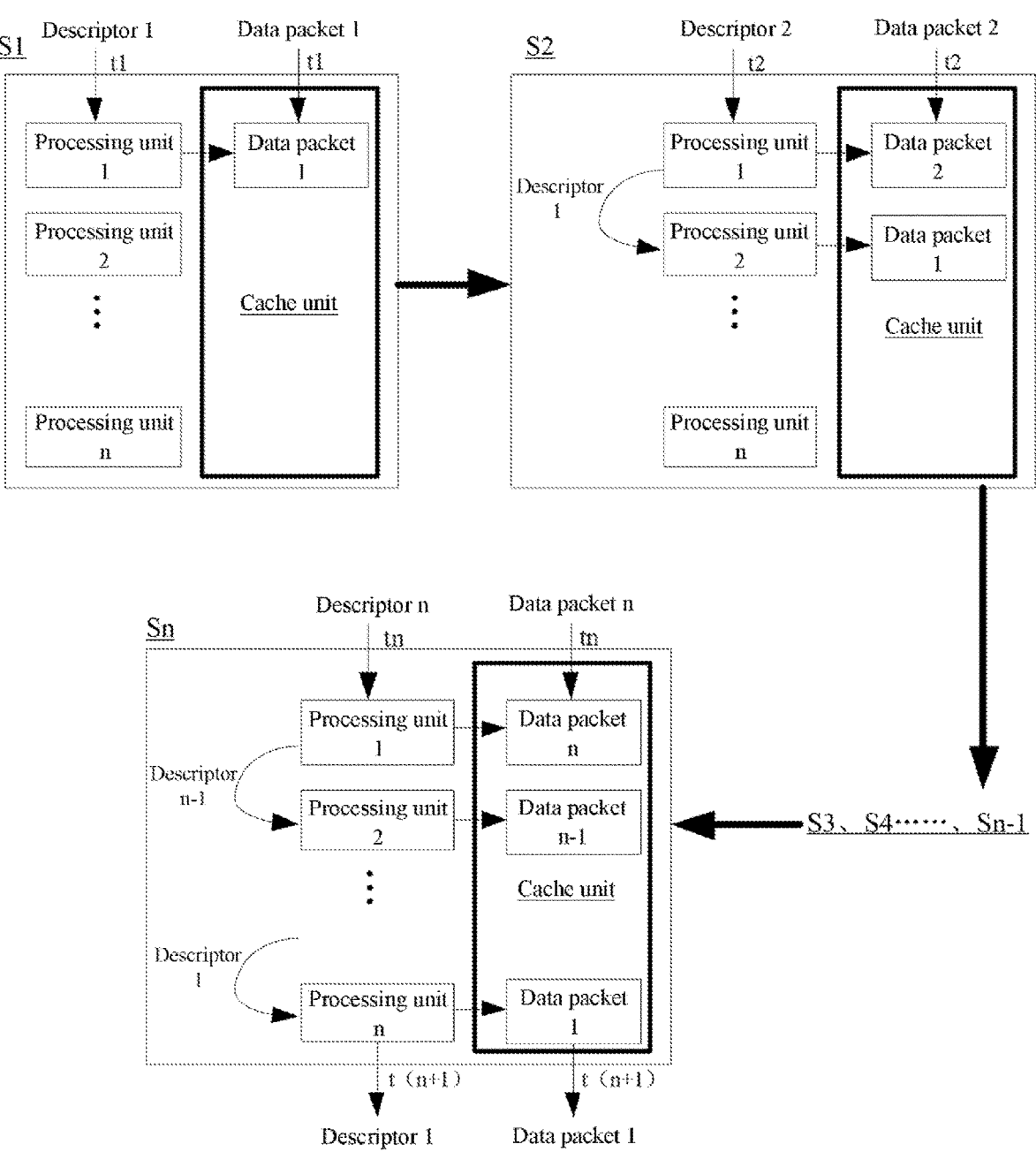
FIG. 5 is schematic state diagram of a data packet processing method provided by the present disclosure.

In the below, the method procedures of the data packet processing apparatus provided by the present disclosure executing the processing on data packets will be illustrated in combination with the drawings. FIG. 5 is schematic state diagram of a data packet processing method provided by the present disclosure, which shows the processing on the data packets and the descriptors, when multiple data packets and descriptors of the data packets are received sequentially at multiple continuous time, by the data packet processing apparatus as shown in FIG. 4.

In state S1 as shown in FIG. 5, at first time t1, the data packet processing apparatus receives data packet 1 and descriptor 1 of data packet 1. At this time, the data packet processing apparatus stores data packet 1 into the cache unit; at the same time, by processing unit 1 receiving descriptor 1 and storing data packet 1 into the cache unit, processing unit 1 is enabled to process data packet 1 stored in the cache unit according to descriptor 1. Subsequently, state S2 as shown in FIG. 5 is marked as second time t2, at this time, processing unit 1 has processed data packet 1 and sent descriptor 1 of data packet 1 to processing unit 2, and processing unit 2 processes data packet 1 stored in the cache unit according to descriptor 1; at the same time, the data packet processing apparatus receives data packet 2 and descriptor 2 of data packet 2, and stores data packet 2 into the cache unit, so that processing unit 1 can process data packet 2 stored in the cache unit according to descriptor 2. By analogy, at $n^{th}$ time in state Sn as shown in FIG. 5, processing unit n receives descriptor 1 sent by processing unit n−1, and can process data packet 1 stored in the cache unit according to descriptor 1; at the same time, the data packet processing apparatus receives data packet n and descriptor n of data packet n, and stores data packet n into the cache unit, so that processing unit 1 can process data packet n stored in the cache unit according to descriptor n.

Figure 6:
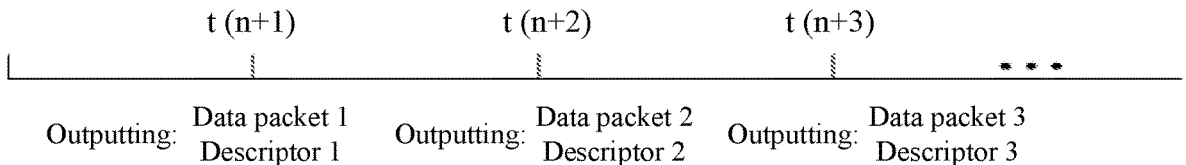
FIG. 6 is schematic diagram of a timing sequence of processing data packets by a data packet processing apparatus provided by the present disclosure.

FIG. 6 is schematic diagram of a timing sequence of processing data packets by a data packet processing apparatus provided by the present disclosure, in which, it is assumed that the data packet processing apparatus completes the processing on data packet 1 and outputs data packet 1 and descriptor 1 at time t(n+1) after receiving data packet 1 and descriptor 1. Since the data packet processing apparatus processes data packets in parallel, the data packet processing apparatus can start to process data packet 2 at time t2, without waiting until the processing on data packet 1 is completed at time t(n+1). So that the data packet processing apparatus can output the processed data packet 2 and descriptor 2 at time t(n+2), by analogy, output the processed data packet 3 and descriptor 3 at time t(n+3) Finally, the data packet processing apparatus sends updated data packets and corresponding descriptors to other subsequent apparatus for processing, the present disclosure does not limit the subsequent processing on the data packets output by the data packet processing apparatus.

In summary, in the data packet processing apparatus provided by the embodiment of the present disclosure, when the multiple data packets and descriptors are continuously received, the data packet processing apparatus stores the data packets into the cache unit and respectively processes the multiple data packets by the multiple processing units in parallel and at the same time according to the descriptors of the multiple data packets; a state of the timing sequence as shown in FIG. 6 is achieved, which compared with a state of the timing sequence shown in FIG. 3, due to a reduction of invalid waiting time when processing the data packets, reduces processing time for the continuously received data packets, improves the speed and efficiency when processing the data packets, and ensures the real-time processing on the data packets.

Figure 7:
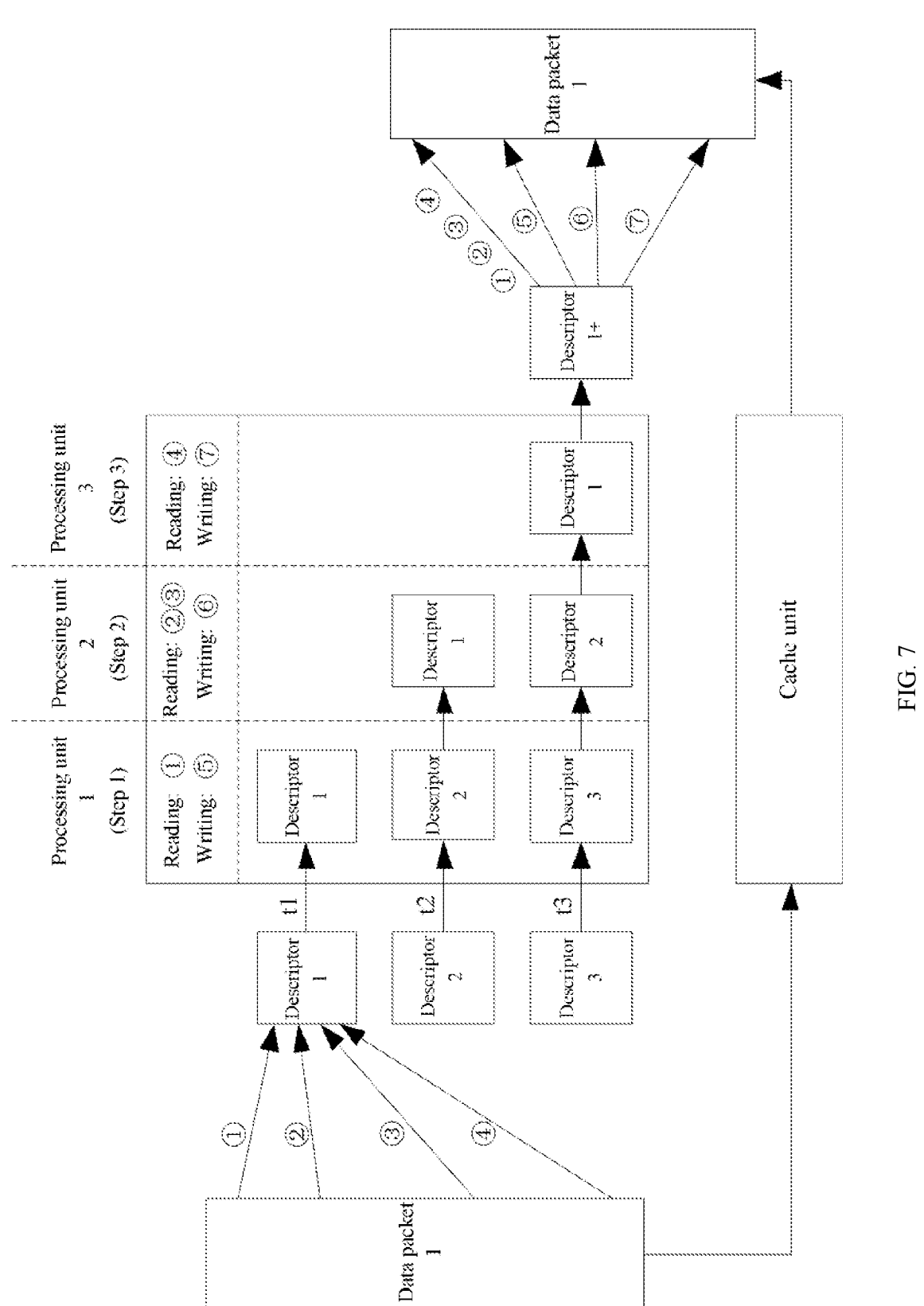
FIG. 7 is schematic state diagram of an embodiment of a data packet processing method provided by the present disclosure.

For example, FIG. 7 is schematic state diagram of an embodiment of a data packet processing method provided by the present disclosure, which shows a specific implementation of performing a processing on the continuously received data packets by the data packet processing apparatus provided by the present disclosure, in which a case where the data packet processing apparatus includes 3 processing units: processing unit 1, processing unit 2, and processing unit 3 is taken as an example, these three processing units can corresponding to three processing steps on a data packet: step 1, step 2, and step 3. Data packet 1 includes data elements ①-④, descriptor 1 can be used to indicate information of these data elements in data packet 1.

Then, after receiving data packet 1 and descriptor 1 at time t1, the data packet processing apparatus stores data packet 1 into the cache unit and processes data packet 1 by a processing unit 1 according to descriptor 1. It is assumed that, the processing that is needed to be performed on data packet 1 by processing unit 1 is reading data element ① and writing data element ⑤, then processing unit 1 determines information of data elements in data packet 1 according to descriptor 1, and performs operations of reading data element ① and writing data element ⑤ in data packet 1 stored in the cache unit; after the operations of above step 1 are completed, processing unit 1 sends descriptor 1 to processing unit 1 for processing. At time t2, the data packet processing apparatus receives data packet 2 and descriptor 2, stores data packet 2 into the cache unit, and processes data packet 2 by a processing unit 1 according to descriptor 2; at this time, i.e. at time t2, processing unit 2 processes data packet 1 according to descriptor 1, and performs operations of reading data elements ② and ③ and writing data element ⑥, processing unit 1 and processing unit 2 implement parallel processing on different data packets. By analogy, at time t3, the data packet processing apparatus receives data packet 3 and descriptor 3, stores data packet 3 into the cache unit, and processes data packet 3 by processing unit 1 according to descriptor 3; at this time, i.e. at time t3, processing unit 2 processes data packet 2 according to descriptor 2, processing unit 3 processes data packet 1 according to descriptor 1 and performs operations of reading data elements ④ and writing data element ⑦, processing unit 1, processing unit 2, and processing unit 3 jointly implement parallel processing on different data packets. Finally, when processing units 1-3 complete the operations of all three steps on data packet 1, the data packet processing apparatus can generate new descriptor 1+ corresponding to data packet 1, the descriptor 1+ can be used to indicate information of data elements ①-④ included in data packet 1 and newly written data elements ⑤-⑦.

In the example as shown in FIG. 7, each data packet is processed via three steps by processing unit 1 to processing unit 3. In some other embodiments, some data packets may only require some of the steps, which requires a processing unit to determine whether the processing unit needs to process a data packet, thereby differentiating the processing on the data packets, improving the overall configuration flexibility and practicality of the solution, so that the solution is more universal and conducive to promotion and implementation.

For example, data packet 1 as shown in FIG. 7 only requires a processing via processing unit 1 and processing unit 3, then, after processing unit 1 completes the processing on data packet 1 according to descriptor 1, descriptor 1 is directly sent to processing unit 3; then, at time t2, processing unit 1 processes data packet 2 according to descriptor 2, processing unit 3 processes data packet 1 according to descriptor 1 at the same time. Or, after processing unit 1 completes the processing on data packet 1 according to descriptor 1, processing unit 1 sends descriptor 1 directly sent to processing unit 2; processing unit 2 performs a determination on data packet 1 indicated by descriptor 1 according to a filtering condition, when it is determined that data packet 1 does not meet the filtering condition, i.e. processing unit 2 does not need to process data packet 1, processing unit 2 directly sends descriptor 1 of data packet 1 to the next processing unit 3; similarly, at time t2, processing unit 1 can process data packet 2 according to descriptor 2, processing unit 3 processes data packet 1 according to descriptor 1 at the same time.

For another example, data packet 1 as shown in FIG. 7 only requires a processing via processing unit 1, then, after processing unit 1 completes the processing on data packet 1 according to descriptor 1, if processing unit 1 determines that all processing steps for data packet 1 have been completed, it can stop sending descriptor 1 of data packet 1 to other subsequent processing units, and instead directly output data packet 1 and descriptor 1 as outputs of the data packet processing apparatus to subsequent apparatus for processing.

The present disclosure also provides a data packet processing method, which can be executed by the data processing apparatus provided by the present disclosure. The data packet processing method includes: sequentially receiving multiple data packets and storing the received data packets into a cache unit, where, the cache unit can be used to store a next data packet before a processing on any data packet by the multiple processing units is completed; sequentially receiving, by the multiple processing units, multiple descriptors corresponding to the multiple data packets, and processing a data packet corresponding to a descriptor stored in the cache unit according to each descriptor of the multiple descriptors, and sending a descriptor of a processed data packet to a next connected processing unit; where, before a processing on any data packet by the multiple processing units is completed, if any processing unit receives a descriptor corresponding to a next data packets, processing the next data packet according to the descriptor corresponding to the next data packet. For the specific implementation of the above data packet processing method, reference can be made to the description of the aforementioned embodiments in the present disclosure, and will not be repeated.

In summary, according to the data packet processing method and apparatus, when multiple data packets and descriptors are continuously received, the data packet processing apparatus stores the data packets in a cache unit, and the multiple data packets are processed respectively, by multiple processing units, in parallel and at the same time according to the descriptors of the multiple data packets. Due to a reduction of invalid waiting time when processing the data packets, and a reduction of processing time for the continuously received data packets, the speed and efficiency when processing the data packets are improved, and a real-time processing on the data packets is ensured.

It should be noted that in the data packet processing apparatus described above in this embodiment, the division of each module/unit is only a division of logical function. In actual implementation, all modules and/or units can be fully or partially integrated into a physical entity or can be physically separated. And these modules can all be implemented in the form of a software called by a processing component; it can also be fully implemented in hardware form; some modules can also be implemented in the form of a processing component calling a software, while others can be implemented in the form of hardware. It can be implemented in a separately established processing component or in a chip which integrated into the aforementioned apparatus. In addition, it can also be stored in the memory of the aforementioned apparatus in the form of program code, which can be called and executed by a processing component of the aforementioned apparatus to determine the functions of the module. The implementation of other modules is similar. In addition, all or part of these modules can be integrated together or implemented independently. The processing component described here can be an integrated circuit with signal processing capabilities. During the implementation process, each step or module of the above method can be completed through integrated logic circuits of hardware in the processor components or through instructions in software form.

For example, the above modules/units can be one or more integrated circuits configured to implement the above methods, such as one or more application specific integrated circuits (ASIC), one or more digital signal processors (DSP), or one or more field programmable gate arrays (FPGA), etc. For another example, when a module above is implemented in the form of a processing component calling a program code, the processing component can be a general purpose processor, such as a central processing unit (CPU) or other processors that can call a program code. For a further example, these modules can be integrated together and implemented in the form of a system on a chip (SOC).

In the above embodiments, it can be fully or partially implemented through software, hardware, firmware, or any combination thereof. When implemented using software, it can be fully or partially implemented in the form of a computer program product. The computer program product includes one or more computer instructions. When loading and executing the computer program instructions on a computer, all or part of the processes or functions described in the embodiments of the present disclosure are generated. The computer can be a general purpose computer, a specialized computer, a computer network, or other programmable apparatuses. The computer instructions can be stored in a computer readable storage medium or transmitted from one computer readable storage medium to another computer readable storage medium, for example, the computer instructions can be transmitted from a web site site, computer, server or data center to another website site, computer, server or data center through a wired form (such as coaxial cable, fiber optic, digital subscriber line (DSL)) or a wireless form (such as infrared, wireless, microwave, etc.). The computer readable storage medium can be any available medium that the computer can access, or a data storage device such as a server or data center integrated by including one or more available medium. The available medium can be a magnetic medium (such as a floppy disk, a hard drive, a magnetic tapes), an optical medium (such as a DVD), or a semiconductor medium (such as a solid-state state disk (SSD)), etc.

The present disclosure also provides an electronic device, including: a processor and a memory; where, the memory stores a computer program, and when the processor executes the computer program, the processor can be configured to execute any data packet processing method in the aforementioned embodiments of the present disclosure.

The present disclosure also provides a computer readable storage medium, where, the computer readable storage medium stores a computer program, the computer program can be configured to execute any data packet processing method in the aforementioned embodiments of the present disclosure when being executed.

An embodiment of the present disclosure also provides a chip for running instructions, the chip is configured to execute the data packet processing method executed by the data packet processing apparatus in any aforementioned embodiment of the present disclosure.

An embodiment of the present disclosure also provides a program product, the program product includes a computer program, the computer program is stored in a storage medium. At least one processor can read the computer program from the storage medium, and when the at least one processor executes the computer program, the data packet processing method executed by the data packet processing apparatus in any aforementioned embodiment of the present disclosure can be implemented.

Those of ordinary skill in the art can understand that all or part of the steps to implement the above respective method embodiments can be completed through hardware related to program instructions. The aforementioned programs can be stored in a computer readable storage medium. When the program is executed, the steps including the above respective method embodiments are executed; the aforementioned storage medium includes various mediums that can store program codes, such as ROM, RAM, magnetic disks, or optical disks.

An aspect of the present disclosure provides a data processing apparatus, including: a cache unit, and multiple processing units; where, the multiple processing units are sequentially connected in series, each processing unit is connected to the cache unit; the cache unit is configured to sequentially receive multiple data packets and store the received data packets, the cache unit receives a next data packet before a processing on any data packet by the multiple processing units is completed; the multiple processing units are configured to sequentially receive multiple descriptors corresponding to the multiple data packets, and process a data packet corresponding to a descriptor stored in the cache unit according to each descriptor of the multiple descriptors, and send a descriptor of a processed data packet to a next connected processing unit; where, before a processing on any data packet by the multiple processing units is completed, if any processing unit receives a descriptor corresponding to a next data packet, the any processing unit processes the next data packet according to the descriptor corresponding to the next data packet.

An aspect of the present disclosure provides a data packet processing method, which can be applied in the data processing apparatus provided by the first aspect of the present disclosure. The data packet processing method includes: sequentially receiving multiple data packets and storing the received data packets into a cache unit, where, the cache unit receives a next data packet before a processing on any data packet by the multiple processing units is completed; sequentially receiving, by the multiple processing units, multiple descriptors corresponding to the multiple data packets, and processing a data packet corresponding to a descriptor stored in the cache unit according to each descriptor of the multiple descriptors, and sending a descriptor of a processed data packet to a next connected processing unit; where, before a processing on any data packet by the multiple processing units is completed, if any processing unit receives a descriptor corresponding to a next data packets, processing the next data packet according to the descriptor corresponding to the next data packet.

An aspect of the present disclosure provides an electronic device, including: a processor and a memory; where, the memory stores a computer program, and when the processor executes the computer program, the processor can be configured to execute the data packet processing method as described in the second aspect of the present disclosure.

An aspect of the present disclosure provides a computer readable storage medium, where, the computer readable storage medium stores a computer program, the computer program can be configured to execute the data packet processing method as described in the second aspect of the present disclosure when being executed.

Finally, it should be noted that the above respective embodiments are only used to illustrate the technical solution of the present disclosure and not to limit it; although the present disclosure has been described in detail with reference to the aforementioned respective embodiments, those of ordinary skill in the art should understand that modifications can still be made to the technical solutions recorded in the aforementioned respective embodiments, or equivalently replacement can also be made to some or all of the technical features therein. And these modifications or replacements do not make the essence of the corresponding technical solutions deviate from the scope of the technical solutions of the respective embodiments of the present disclosure.

What is claimed is:

1. A data packet processing apparatus, comprising:
a cache, and multiple processors; wherein, the multiple processors are sequentially connected in series, each processor is connected to the cache;
the cache is configured to sequentially receive multiple data packets and store the received data packets, the cache is used to store a next data packet before a processing on any data packet by the multiple processors is completed;
the multiple processors are configured to sequentially receive multiple descriptors corresponding to the multiple data packets, and process a data packet, corresponding to a descriptor, stored in the cache according to each descriptor of the multiple descriptors, and send a descriptor of a processed data packet to a next connected processor; wherein, before a processing on any data packet by the multiple processors is completed, based on a respective processor receiving a descriptor corresponding to a next data packet, the respective processor processes the next data packet according to the descriptor corresponding to the next data packet.

2. The data packet processing apparatus according to claim 1, wherein,
in the multiple processors, a first processor that is located in a serial initial position is configured to: receive the multiple descriptors of the multiple data packets sequentially and respectively, process a data packet, corresponding to a received descriptor, stored in the cache according to the received descriptor, and send a descriptor of a processed data packet to the next connected processor;
in the multiple processors, other processors other than the first processor are configured to: receive a descriptor sent by a previous connected processor sequentially and respectively, process a data packet, corresponding to the descriptor received from the previous connected processor, stored in the cache according to the descriptor received from the previous connected processor, and send a descriptor of a processed data packet to the next connected processor.

3. The data packet processing apparatus according to claim 1, wherein, each processor in the multiple processors is further configured to:

determine, according to a received descriptor, position information of a candidate data element in a data packet corresponding to the received descriptor; and perform, according to the position information, an operation of reading or writing on the candidate data element in the data packet.

4. The data packet processing apparatus according to claim 3, wherein, each processor in the multiple processors is further configured to: modify the received descriptor of the data packet according to the operation on the candidate data element in the data packet, and send a modified descriptor to a next processor.

5. The data packet processing apparatus according to claim 1, further comprising:

a second processor, configured to: after the multiple processors complete the processing on the data packet sequentially, modify the descriptor of the data packet according to the processing on the data packet by the multiple processors, wherein the second processor is one of the multiple processors.

6. The data packet processing apparatus according to claim 1, wherein, a processor in the multiple processors is further configured to: based on it is determined that all processing steps on the data packet are completed, stop sending the descriptor of the processed data packet to a next processor connected with the processor.

7. The data packet processing apparatus according to claim 1, wherein, further comprising:

a processor in the multiple processors is further configured to: after the data packet is received, based on it is determined that the data packet does not meet a filtering condition, directly send the descriptor corresponding to the data packet to a next processor connected with the processor.

8. The data packet processing apparatus according to claim 7, wherein, the filtering condition is that the data packet is necessary to be processed by the processor in the multiple processors.

9. The data packet processing apparatus according to claim 1, wherein, the data packet processing apparatus comprise: a 5G communication chip or a Wireless Fidelity Wi-Fi communication chip.

10. A data packet processing method, applied in a data processing apparatus, the data processing apparatus comprises: a cache, and multiple processors; wherein, the multiple processors are sequentially connected in series, each processor is connected to the cache;

the data packet processing method comprises:

sequentially receiving multiple data packets and storing the received data packets into the cache; wherein, the cache is used to store a next data packet before a processing on any data packet by the multiple processors is completed;

sequentially receiving, by the multiple processors, multiple descriptors corresponding to the multiple data packets, and processing a data packet, corresponding to a descriptor, stored in the cache according to each descriptor of the multiple descriptors, and sending a descriptor of a processed data packet to a next connected processor; wherein, before a processing on any data packet by the multiple processors is completed, based on a respective processor receiving a descriptor corresponding to a next data packets, processing the next data packet according to the descriptor corresponding to the next data packet.

11. The data packet processing method according to claim 10, specifically comprising:

receiving, by a first processor that is located in a serial initial position in the multiple processors, the multiple descriptors of the multiple data packets sequentially and respectively, processing, by the first processor, a data packet, corresponding to a received descriptor, stored in the cache according to the received descriptor, and sending a descriptor of the processed data packet to the next connected processor;

receiving, by other processors other than the first processor in the multiple processors, a descriptor sent by a previous connected processor sequentially and respectively, processing, by the other processors, a data packet, corresponding to the descriptor received from the previous connected processor, stored in the cache according to the descriptor received from the previous connected processor, and sending a descriptor of a processed data packet to the next connected processor.

12. The data packet processing method according to claim 10, specifically comprising:

determining, according to a received descriptor, position information of a candidate data element in a data packet corresponding to the received descriptor; and performing, according to the position information, an operation of reading or writing on the candidate data element in the data packet.

13. The data packet processing method according to claim 12, further comprising:

modifying, by each processor in the multiple processors, the received descriptor of the data packet according to the operation on the candidate data element in the data packet, and sending a modified descriptor to a next processor.

14. The data packet processing method according to claim 10, further comprising:

after the processing on the data packet sequentially is completed, modifying, by a second processor, the descriptor of the data packet according to the processing on the data packet by the multiple processors, wherein the second processor is one of the multiple processors.

15. The data packet processing method according to claim 10, further comprising:

based on it is determined that all processing steps on the data packet are completed, a processor in the multiple processors stopping sending the descriptor of the processed data packet to a next processor connected with the processor.

16. The data packet processing method according to claim 10, further comprising:

after the data packet is received, based on it is determined that the data packet does not meet a filtering condition, directly sending, by a processor in the multiple processors, the descriptor corresponding to the data packet to a next processor connected with the processor.

17. The data packet processing method according to claim 16, wherein, the filtering condition is that the data packet is necessary to be processed by the processor in the multiple processors.

18. A non-transitory computer readable storage medium, wherein, the computer readable storage medium stores a computer program, the computer program is configured to execute the data packet processing method according to claim 10 when being executed.

* * * * *